US010820162B2

(12) United States Patent
Gupta et al.

(10) Patent No.: US 10,820,162 B2
(45) Date of Patent: Oct. 27, 2020

(54) METHOD AND SYSTEM FOR MOBILE USER-INITIATED LTE BROADCAST

(71) Applicant: AT&T INTELLECTUAL PROPERTY I, LP, Atlanta, GA (US)

(72) Inventors: Gaurav Gupta, Sammamish, WA (US); Rajendra Prasad Kodaypak, Sammamish, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 290 days.

(21) Appl. No.: 14/962,152

(22) Filed: Dec. 8, 2015

(65) Prior Publication Data

US 2017/0164161 A1    Jun. 8, 2017

(51) Int. Cl.
| | |
|---|---|
| *H04W 4/06* | (2009.01) |
| *H04W 4/02* | (2018.01) |
| *H04L 29/06* | (2006.01) |
| *H04W 12/08* | (2009.01) |

(52) U.S. Cl.
CPC .............. *H04W 4/06* (2013.01); *H04L 63/102* (2013.01); *H04W 4/023* (2013.01); *H04W 12/0806* (2019.01)

(58) Field of Classification Search
None
See application file for complete search history.

(56) References Cited

U.S. PATENT DOCUMENTS

| 9,002,281 B2 | 4/2015 | Khoryaev et al. |
| 9,036,603 B2 | 5/2015 | Venkatachalam et al. |
| 2005/0030966 A1* | 2/2005 | Cai .............. H04L 12/877 370/432 |

(Continued)

FOREIGN PATENT DOCUMENTS

| EP | 2878157 A1 | 6/2015 |
| GB | 2502581 A | 12/2013 |

(Continued)

OTHER PUBLICATIONS

Mad , Arash et al., "WiFi Direct and LTE D2D in action", Wireless Days (WD), IFIP. IEEE, 2013.

(Continued)

*Primary Examiner* — Charles C Jiang
*Assistant Examiner* — Saad Khawar
(74) *Attorney, Agent, or Firm* — Guntin & Gust, PLC; Dana Lemoine

(57) ABSTRACT

Aspects of the subject disclosure may include, for example, receiving a request to initiate a wireless media broadcast of media content by way of a wireless mobility network to mobile devices within a geographical area, wherein the media content is provided by a first mobile device. A group of wireless access terminals is determined based on the geographical area, wherein the group of wireless access terminals provides wireless services of the wireless mobility network to a serving area within the geographical area. The group of wireless access terminals is directed to initiate a Multimedia Broadcast/Multicast Service (MBMS) bearer service to distribute the media content to the group of mobile devices within the serving area. Other embodiments are disclosed.

20 Claims, 7 Drawing Sheets

(56) References Cited

U.S. PATENT DOCUMENTS

| | | | |
|---|---|---|---|
| 2008/0076362 A1* | 3/2008 | Tian | H04W 76/45 |
| | | | 455/90.2 |
| 2010/0267356 A1* | 10/2010 | Ohgushi | G08B 27/006 |
| | | | 455/404.1 |
| 2012/0082098 A1* | 4/2012 | Oprescu-Surcobe | |
| | | | H04L 65/00 |
| | | | 370/329 |
| 2013/0194999 A1* | 8/2013 | Anchan | H04W 4/06 |
| | | | 370/312 |
| 2013/0263190 A1 | 10/2013 | Aravindakshan et al. | |
| 2013/0273923 A1 | 10/2013 | Li et al. | |
| 2013/0290696 A1 | 10/2013 | Broustis et al. | |
| 2013/0324114 A1 | 12/2013 | Raghothaman et al. | |
| 2014/0010172 A1 | 1/2014 | Wei et al. | |
| 2014/0078952 A1 | 3/2014 | Bontu et al. | |
| 2014/0130137 A1 | 5/2014 | Baek et al. | |
| 2014/0134970 A1* | 5/2014 | Pazos | H04L 65/4069 |
| | | | 455/404.1 |
| 2014/0187192 A1* | 7/2014 | Keller | H04W 4/90 |
| | | | 455/404.1 |
| 2014/0219261 A1 | 8/2014 | Johnsson et al. | |
| 2014/0241229 A1 | 8/2014 | Bertorelle et al. | |
| 2014/0355493 A1 | 12/2014 | Niu et al. | |
| 2015/0079979 A1* | 3/2015 | Anchan | H04W 76/15 |
| | | | 455/433 |
| 2015/0098385 A1 | 4/2015 | Navalekar et al. | |
| 2015/0156693 A1 | 6/2015 | Tabet et al. | |
| 2015/0181546 A1 | 6/2015 | Freda et al. | |
| 2015/0245295 A1 | 8/2015 | Jha et al. | |
| 2015/0249937 A1 | 9/2015 | Lindoff et al. | |
| 2015/0281913 A1* | 10/2015 | Gholmieh | H04L 1/1621 |
| | | | 370/312 |
| 2015/0282000 A1 | 10/2015 | Andersson et al. | |
| 2015/0363797 A1* | 12/2015 | Ramesh | G06Q 30/0201 |
| | | | 705/7.29 |
| 2016/0249266 A1* | 8/2016 | Kim | H04W 4/06 |
| 2017/0094359 A1* | 3/2017 | Basra | H04N 21/47202 |

FOREIGN PATENT DOCUMENTS

| | | |
|---|---|---|
| WO | 2013139041 A1 | 9/2013 |
| WO | 2014181043 A1 | 11/2014 |
| WO | 2014189782 A1 | 11/2014 |
| WO | 2015056969 A1 | 4/2015 |
| WO | 2015090355 | 6/2015 |
| WO | 2015095595 | 6/2015 |

OTHER PUBLICATIONS

Doppler, Klaus et al., "Device-to-device communication as an underlay to LTE-advanced networks", Communications Magazine, IEEE 47.12, 2009, 42-49.

Fodor, Gabor et al., "Design aspects of network assisted device-to-device communications", Communications Magazine, IEEE 50.3, 2012, 170-177.

Lei, Lei et al., "Operator Controlled Device-To-Device Communications in LTE-Advanced Networks", IEEE Wireless Communications, 97, 2012.

Pyattaev, Alexander et al., "3GPP LTE traffic offloading onto WiFi Direct", Wireless Communications and Networking Conference Workshops (WCNCW), IEEE, 2013.

Yu, Chia-Hao et al., "Resource sharing optimization for device-to-device communication underlaying cellular networks", Wireless Communications, IEEE Transactions on 10.8, 2011, 2752-2763.

\* cited by examiner

100

200

300

METHOD AND SYSTEM FOR MOBILE USER-INITIATED LTE BROADCAST

FIELD OF THE DISCLOSURE

The subject disclosure relates to a method and system for mobile user-initiated LTE broadcast.

BACKGROUND

Traditional LTE 4G mobile networks deliver high-speed triple-play/quad-play mobile services. These services can include live and/or recorded media content that originates from various content providers. For example, media content can be packaged as transcoded IP data segments before being sent as unicast and/or broadcast IP flows over a unicast and/or broadcast core network towards mobile end users. The telecom industry has experienced a rapid growth in high-speed mobile data traffic and computing applications. These trends have fundamentally shifted applications from traditional "connection-centric," such as voice/video calling, data and text messaging, towards "content-centric" communications, such as high-definition video streaming and content sharing.

BRIEF DESCRIPTION OF THE DRAWINGS

Reference will now be made to the accompanying drawings, which are not necessarily drawn to scale, and wherein.

DETAILED DESCRIPTION

Figure 1:
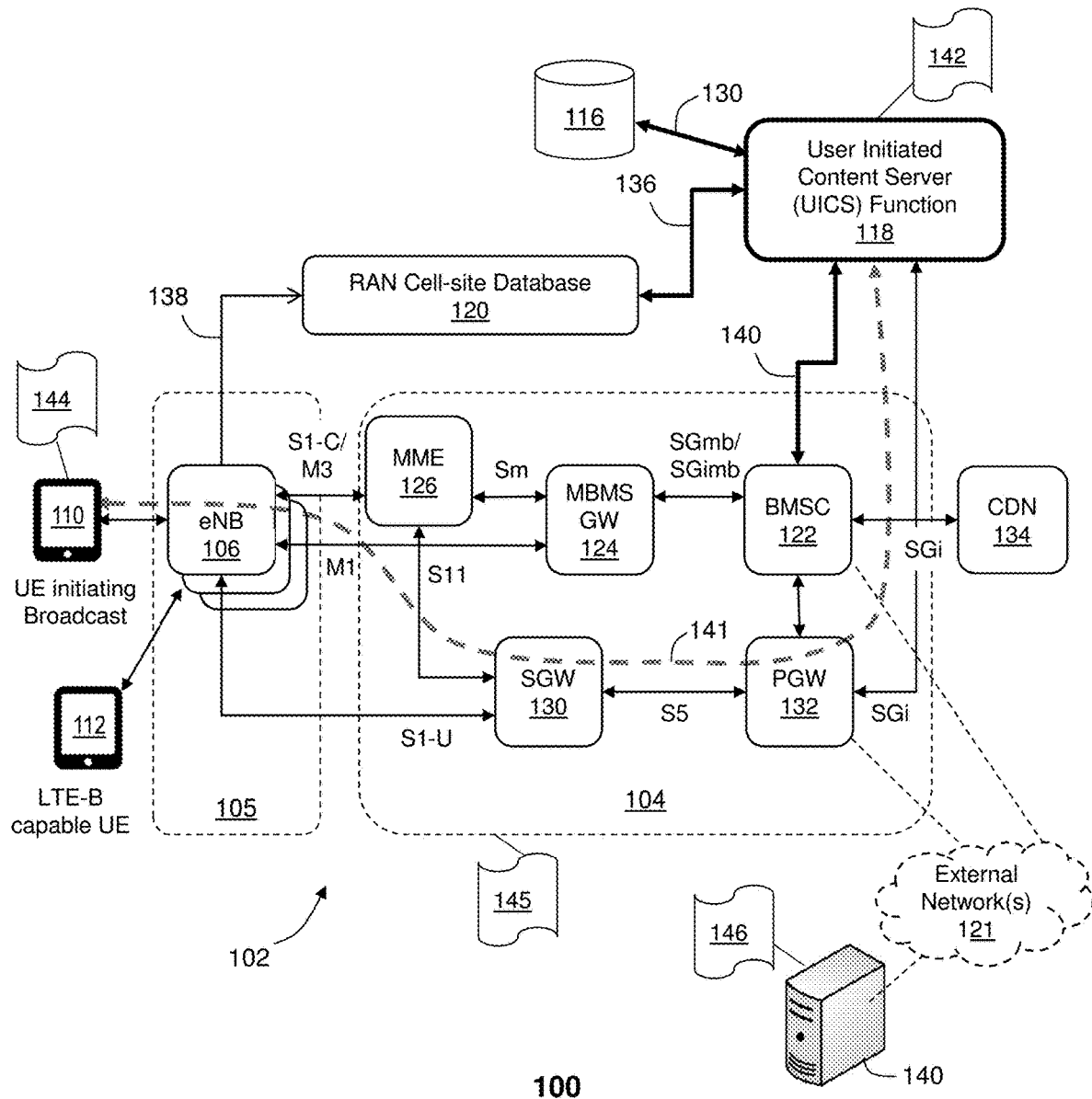
FIG. 1 depicts an illustrative embodiment of a user-initiated broadcast system.

The subject disclosure describes, among other things, illustrative embodiments for facilitating in a mobility network broadcast directly from a mobile device and broadcasting content obtained from the mobile device to a serving area. Establishing the mobility network broadcast and/or broadcasting content obtained from the mobile device can be accomplished without network and/or operator intervention. The broadcast of content can be established in a user-defined target serving area. In at least some embodiments, facilitation of the broadcast can be accomplished in real-time. Other embodiments are described in the subject disclosure.

One or more aspects of the subject disclosure include a processor and a memory that stores executable instructions. The executable instructions, when executed by the processor, facilitate performance of operations. The operations include receiving media content from a first mobile device, by way of a wireless mobility network. The operations further include detecting a request to distribute the media content to a number of mobile devices within a geographical region by way of the wireless mobility network. A base station of the wireless mobility network is identified based on the geographical region, wherein the base station provides wireless services to a serving area within the geographical region. The operations also direct the base station to initiate a Multimedia Broadcast/Multicast Service (MBMS) bearer service to distribute the media content to the number of mobile devices within the serving area.

One or more aspects of the subject disclosure include receiving, by a system that includes a processor, a request from a first mobile device to distribute media content to a number of mobile devices by way of a wireless mobility network, wherein the media content is obtained by the first mobile device. A geographical area is determined by the system, and a base station of the wireless mobility network is determined based on the geographical area. The base station provides wireless services to a serving area within the geographical area. A request is submitted by the system to distribute the media content to the number of mobile devices within the serving area.

One or more aspects of the subject disclosure include receiving a request to initiate a wireless media broadcast of media content by way of a wireless mobility network to mobile devices within a geographical area. The media content is provided by the first mobile device. A group of wireless access terminals is determined based on the geographical area, wherein the group of wireless access terminals provides wireless services of the wireless mobility network to a serving area within the geographical area. A group of wireless access terminals is determined to initiate a Multimedia Broadcast/Multicast Service (MBMS) bearer service to distribute the media content to the group of mobile devices within the serving area.

Recent trends provide mobile users with access to vast archives of rich media content. Examples include, without limitation, web pages with multimedia content, streaming media services, e.g., Internet radio, on-demand streaming media services, e.g., Netflix, media sharing services, e.g., YouTube, and the like. In some instances, media content can be uploaded by mobile users for subsequent distribution. Such recorded content, however, generally fails to make an immediate impact. Users have to login or subscribe to over-the-top services such as Twitter, Facebook, CNN's iReport, etc., which provide outlets to reach the masses.

The techniques disclosed herein provide intelligent, user-initiated and network assisted content delivery mechanisms. These mechanisms can utilizes a new application function, e.g., referred to as a user-initiated content service or server (UICS). In some embodiments, the UICS function accepts one or more of user initiated content, geo-mappings of serving cells, a user-defined target serving area, and in some instances, traffic types and related priorities. One or more of these items can be taken into consideration in facilitating distribution of mobile user-initiated media content. The user-initiated media content can be mapped into data segments for sending by way of a broadcast and/or multicast service to multiple mobile users within the target serving area. The broadcast/multicast media content distribution approach efficiently utilizes spectrum resources for radio transmission in the target area.

In some embodiments, the user-initiated content server function 118 is configured with instructions 142, e.g., software, to implement one or more of the features disclosed herein attributable to the user-initiated content server function 118. Likewise, one or more of the mobile UEs 110, 112 can be configured with instructions 144 that facilitate implementation of one or more of the features disclosed herein in relation to the mobile UEs 110, 112. The core network 104, including one or more elements of the core network 104, can be configured with instructions 145 that facilitate implementation of one or more of the features disclosed herein in relation to the core network. Similarly, the application server 140 can be configured with instructions 146 that facilitate implementation of one or more of the features disclosed herein in relation to any of the functionality that can be managed in whole or in part by the application server 140.

FIG. 1 depicts an illustrative embodiment of a user-initiated broadcast system 100 that includes a wireless mobility network 102 providing wireless services to wireless communication devices 110, 112 within a wireless coverage region. In some embodiments, the wireless mobility network 102 includes a network architecture that supports group communications service. Group communications services generally refer to a one-to-many communications capability that supports a sharing of resources, including radio resources, such as radio spectrum. Group communication services can include, without limitation, broadcast services and/or multicast services. In some embodiments, such services can be provided to mobile User Equipment (UE) over a multicast-broadcast single frequency network, e.g., including multimedia, such as network television, cable programs, and/or sporting events.

The broadcast/multicast services disclosed herein can be leveraged by equipment manufacturers, suppliers, maintainers, operators, individuals and the like. Broadcast/multicast content can include, without limitation, media content, e.g., including audio and/or video, data, including instructions, software, software updates, features, configuration changes, and the like. The use of broadcasting and/or multicasting can provide the bandwidth and system efficiencies that are achieved by broadcasting via other channels, such as cable, satellite, and (to a lesser extent) the Internet. The broadcast/multicast services can provide live content, as well as popular file download delivery, to mobile UEs 112 over the wireless mobility network 102. Any of the multicast/broadcast content disclosed herein can originate from a source mobile UE 110 alone or in combination with another source, such as a second source mobile UE, a Core Data Network (CDN) 104 and/or group communications service enabled application server.

In more detail, the example wireless mobility network 102 can be based at least in part on standards developed by the 3rd Generation Partnership Project (3GPP) initiative, with information available at www.3gpp.org. By way of non-limiting example, some 3GPP standards that address group communications system architecture using LTE broadcast (LTE-B) include: 3GPP TS 23.468, entitled "Group Communication System Enablers for LTE (GC-SE_LTE)"; 3GPP TS 25.324, entitled "Broadcast/Multicast Control BMC"; 3GPP TS 23.041, entitled "Technical Realization of Cell Broadcast Service (CBS)" and 3GPP TS 22.246, entitled "MBMS User Services," all incorporated herein by reference in their entireties.

In one embodiment, the wireless mobility network 102 includes a radio access network portion 105 and a core network portion 104, e.g., an Enhanced Packet Core (EPC) or common back bone that can communicate with one or more external networks, sometimes referred to as packet data networks or peer entities. It is envisioned, that the wireless mobility network 102 can include, without limitation, other configurations, such as those associated with General Packet Radio Service (GPRS), generally understood to serve the 2G and/or 3G cellular system.

The radio access network portion 105, without limitation, can include an LTE network architecture sometimes referred to as Evolved Universal mobile Telecommunication system Terrestrial Radio Access (E UTRA) and evolved UMTS Terrestrial Radio Access Network (E-UTRAN). Broadly, the radio access network portion 105 can include one or more wireless mobile terminals or communication devices, sometimes referred to as user equipment (UE), and one or more wireless access nodes, or base transceiver stations.

The base station 106, such as an evolved Node B (e-NodeB) in EUTRAN, communicates with the source mobile UE 110 and the other mobile UEs 112 over the air and wirelessly. The UEs 110, 112 can include, without limitation, any device including a wireless communication capability, sometimes referred to generally as wireless devices, e.g., satellite communication systems, portable digital assistants (PDAs), laptop computers, tablet devices, other mobile devices. More generally, the wireless devices include any wireless network accessible device (e.g., cellular telephones, machines or "things," such as smart appliances, and so on). Although reference is made to user equipment, it is generally understood that the UEs 110, 112 can include network accessible devices that can operation without user intervention or control, e.g., as in Machine-to-Machine (M2M) scenarios, such as the Internet of Things (IoT). Such UEs 110, 112 can connect to the eNBs 110 when the UEs 110, 112 are within range according to a corresponding wireless communication technology.

In some embodiments, the UEs 110, 112 execute application specific instructions that may or may not execute in association with an operating system. The instructions can include an operating system that can include one or more applications that engage in a transfer of data between the UEs 110, 112 and one or more of the external networks 121, including the CDN 134. Such data transfers can include downlink packet transfers from the external network 121 and/or the CDN 134 to the UEs 110, 112, uplink packet transfers from the UEs 110, 112 to the external network 121 and/or CDN 134 or combinations of uplink and downlink packet transfers.

Applications can include, without limitation, web browsing, VoIP, streaming media, file transfers, software updates, security, operation and/or control, application specific programs, and the like. In some embodiments, the data transfer includes streaming media, including one or more of audio, video, audio and video, text, still images, graphics, commands, video gaming content, and the like. Each data transfer can have an associated Quality of Service (QoS), such as a QoS imposed by an associated application. Likewise, each data transfer can have an associated priority that may be imposed by an associated application, a device type, a user identity and/or account. Different packet transfers can be served by different bearers within the core network 104, e.g., according to parameters, such as the QoS.

The core network 104 can use a concept of bearers, e.g., enhanced packet service (EPS) bearers, to route packets, e.g., IP traffic, between a particular gateway in the core network 104 and the UEs 110, 112. A bearer refers generally to an IP packet flow with a defined QoS between the particular gateway and the UEs 110, 112. The access network 105, e.g., E-UTRAN, and the core network 104 together set up and release bearers as required by the various applications.

The core network 104, in turn, includes various network entities, such as a Mobility Management Entity (MME) 126, a Serving Gateway (SGW) 130 and a PDN gateway (PGW) 132. In some embodiments, the MME 126 includes a control node that performs a control signaling between various equipment and devices in the radio access network 105 and the core network 104.

In one or more embodiments, the mobility network 104 can include one or more broadcast multicast service centers (BMSC) 122, or content servers 122, and one or more MBMS Gateway (MBMS-GW) devices 124, or broadcast media gateways 124. The content servers 122 can be capable of selecting, access, and/or receiving data, including messages, software, updates, and the like. The content servers 122 can receive data from data networks, content source providers (e.g., equipment manufacturers, operators, maintainers, television networks or production companies, or sporting leagues), satellite feeds, and/or cable networks. The mobility network 104 can direct content servers 122 to select a particular data item or set of data items for broadcast to user devices 110 via the mobility network 104 and radio access network 105.

In one or more embodiments, the mobility network 104 can include one or more MBMS-GWs 124. Each MBMS-GW 124 manages data paths for transfer of data, including transmission of media, from a content server, referred to generally as the CDN 134 and/or a source mobile UE 110 to one or more end-user mobile UEs 110, 112. In one embodiment, a MBMS-GW 124 can initiate multicast groups, which can allow end user devices 110, 112 to receive multicast content by way of the eNodeB nodes 106. The MBMS-GW 124 can associate each multicast group under its control with unique Internet Protocol (IP) addresses and can offer access to broadcast content that is associated with the multicast group to the end user devices 110, 112 via one or more eNodeB nodes 106. In one embodiment, end user devices 110, 112 can join an offered multicast group by sending a session initiation protocol (SIP) JOIN message to the offering MBMS-GW 124.

In one or more embodiments, the MBMS-GW 124 can manage the initiation and maintenance of bearer paths for transmitting broadcast data to the user devices 110. In one or more embodiments, the MBMS-GW 124 can initiate MBMS sessions with bearer path contexts that are associated with each end user device 110, 112 that has joined each multicast group. The bearer path allows the end user devices 110, 112 to receive multicast and/or broadcast data from the MBMS network 102. The MBMS-GW 124 can store MBMS session attributes for each bearer context. When a bearer path has been initiated, the MBMS-GW 124 can initiate tunnels for user data traffic to particular eNodeB nodes 106 that service end user devices 110, 112 in a particular serving area.

In one or more embodiments, the CDN 134 can transmit media content to one or more MBMS-GW 124 as a unicast data transfer, including a message, a data file, an image, audio, and/or a media stream. In one example, the content server 134 can transmit a direct, unicast stream and/or broadcast message and/or data item to each MBMS-GW 124. In one or more embodiments, the MBMS-GW 124 can generate a multicast and/or broadcast data stream from a received unicast data stream. The MBMS-GW 124 can transmit the multicast and/or broadcast data stream via the bearer path, and the multicast IP address for multicast applications. End user devices 110 that are members of the multicast group for the broadcast media can receive the multicast data transfer from the eNodeB 106 using the multicast IP address.

In one or more embodiments, the mobility network 104 can include a pool of MBMS-GW devices 124 that are deployed in a distributed architecture (i.e., not centralized) in data centers spread across a geographic region that is served by an LTE broadcast service area. In one embodiment, an LTE broadcast service area can be coincident with a geographic region. A series of BMSC groups 122 can, for example, be spread across an LTE broadcast service area to provide multicast-broadcast content to mobile UEs 110, 112 in the broadcast service area.

For illustration purposes only, the MME 126, the SGW 124, the PGW 132, the BMSC 122 and the MBMS-GW 124 network elements or nodes, and so on, can be server devices, but may be referred to in the subject disclosure without the word "server." It is also understood that any form of such servers can operate in a device, system, component, or other form of centralized or distributed hardware and software, including virtual machines, e.g., in relation to software defined networks. It is further noted that these terms and other terms such as bearer paths and/or interfaces are terms that can include features, methodologies, and/or fields that may be described in whole or in part by standards bodies such as the 3GPP and IETF. It is further noted that some or all embodiments of the subject disclosure may in whole or in part modify, supplement, or otherwise supersede final or proposed standards published and promulgated by 3GPP/IETF.

The PGW 132 can provide connectivity between the UE 110, 112 and one or more of the external networks 121. In the illustrative network architecture 100, the PGW 132 can be responsible for IP address allocation for the mobile UEs 110, 112, as well as one or more of QoS enforcement and flow-based charging, e.g., according to rules from a policy and charging rules (PCRF) (not shown). The PGW 132 is also typically responsible for filtering downlink user IP packets into the different QoS-based bearers. In at least some embodiments, such filtering can be performed based on traffic flow templates. The PGW 132 can also perform QoS enforcement, e.g., for guaranteed bit rate bearers. The PGW 132 can also serves as a mobility anchor for interworking with non-3GPP technologies such as CDMA2000 and WiFi.

With increasing numbers of users/devices receiving the same services, efficient information distribution is essential. To this end, group communications, such as broadcast and/or multicast techniques are provided to decrease the amount of data within the network 100 and provide a sharing of limited radio spectrum, resulting in a more efficient use of network resources. In particular, broadcast and multicast are techniques for transmitting data-grams from a single source, such as a user-initiated content service 118 and or the CDN 134 to several destinations, e.g., point-to multipoint. The user-initiated content service 118 and/or a group communication server of the CDN 134 can support exchanging signaling, e.g., signaling (including GCS session and group management aspects) with UEs 110, in some instances, receiving uplink data from UEs 110, delivering data to all UEs 110 belonging to a group, e.g., using unicast and or MBMS delivery, transporting application level session information, and supporting service continuity procedures, e.g., for a UE 110 to switch between unicast/MBMS delivery.

Generally speaking, a multimedia broadcast/multicast service refers to a unidirectional point-to-multipoint service in which data is transmitted from a single source entity to a group of users in a specific area. In at least some embodiments, the MBMS services transmit content over a multicast-broadcast single frequency network. The broadcast/ multicast service has two possible modes: Broadcast mode and Multicast mode. A broadcast session includes a continuous and time-bounded reception of a broadcast service by the UE 110. Likewise, a multicast session is a continuous and time-bounded reception of a multicast service by the UE 110.

A broadcast service can be defined as a unidirectional, point-to-multipoint service in which data is efficiently transmitted from a single source to multiple UEs 112 in an associated broadcast service area. Broadcast services may be received by UEs 112 configured to access broadcast service locally, and who are in the broadcast area defined for the service. Likewise, a multicast service can be defined as a unidirectional point-to-multipoint service in which data is efficiently transmitted from a single source to multiple UEs 112 in an associated multicast service area. It is generally understood that a multicast service is directed to a multicast subscription group. For example, UE access to a multicast service requires a subscription that associates the UE 110 with the service. Broadcast and/or multicast services may be received by all UEs 110 configured to receive broadcast and/or multicast service(s), and fall within an associated broadcast/multicast area defined for the service. For example, the broadcast/multicast service area can be determined according to wireless coverage maps of base transceiver stations 106, e.g., sectors, regions and so on, that provide broadcast/multicast service. The UEs 112 can be configured to monitor one or more broadcast channels for such broadcast/multicast messages. The UEs 112 can be configured to monitor a selective paging channel, such as a broadcast channel, whether the UE 110 is in an idle state or an active state.

The broadcast-multicast service area can represent a geographical area, such as a region, a state, county, town, an area defined by a geometric shape, such as a polygon, circle, ellipse, a piecewise continuous closed shape or some combination thereof in reference to a geographical region, e.g., as defined by a map. In some applications the broadcast area can be defined individually per broadcast service application, per broadcast service subscriber, and the like. For example, an emergency broadcast message can have a broadcast area associated with a content of the message, a subscription of the service. Consider an emergency broadcast message directed to an area affected by a natural event, such as a hurricane, a flash flood or a forest fire, an Amber Alert, and the like. In some embodiments, the group communication service area is identified by a requesting entity, such as a news station, a government entity, and so on.

For group communications services, the example network architectures 100 include an interface 140 or reference point by which the MBMS services of the mobility network can be accessed. For example, in LTE applications, the user-initiated content service 118 can be implemented by a Group Communication Service Application Server (GCS-AS), in which instances the interface or reference point 140 can include features of an MB2 interface. The MB2 interface 140 can include a signaling or control plane interface, e.g., MB2-C, and a data or user plane interface, e.g., MB2-U. As illustrated, the MB2 interface 140 can exist between the BMSC 122 and the selective paging function 118, or more generally between the BMSC 122 and a Group Communication Service Application Server (GCS-AS).

It is understood that the particular network elements of the example network architecture 100 are representative. Although the MB2 reference point 140 is disclosed in certain industry standards, it is understood that any reference to MB2 herein can include features of applicable industry standards, with or without additions, deletions and modifications to any applicable standardized features, including proprietary reference points, protocols and the like. In at least some embodiments, the MB2 interface 140 or reference point provides an ability for applications to request an allocation and/or deallocation of one or more of a set of temporary mobile group identities, a request to activate, deactivate and modify an MBMS bearer, and for allowing the BMSC 122 to notify an application, such as a broadcast application of the source mobile UE 110, of the status of an MBMS bearer. In at least some embodiments, the MB2 reference point 140 can include one or more other features disclosed herein, such as supporting a selection of a particular network element and/or network configuration in relation to an establishment and/or maintenance of any MBMS bearer services.

In establishing a new group communication service, e.g., in response to a request from the user-initiated content service 118, the BMSC 122 can initiate a group communication service session request directed to the MBMS-GW 124. The MBMS-GW 124 responds to the BMSC 122 with session response. The MBMS-GW 124 then sends a session start request to the MME 126, which sends it to the eNB 106, e.g., on an M3 Stream Control Transmission Protocol (SCTP) based interface. In response, the eNB 106 sends a session start response to the MME 126, which sends it to the MBMS-GW 124. Upon successful establishment of the session and radio resource allocation, the eNB 106 can join the transport network IP multicast address to receive the user data from MBMS-GW 124.

An example broadcast and/or multicast bearer path 242 (FIG. 2) is illustrated between the user-initiated content service 218 and the mobile UEs 212. Other network elements along the broadcast and/or multicast bearer path 141, include the BMSC 122, the MBMS-GW 124 and the eNB 106. In some embodiments, the broadcast and/or multicast path extends from another data source, such as the CDN 134. Thus, the user-initiated content service 118 can request a broadcast and/or multicast service based on data item(s) from the source mobile UE 110, and/or from another source, such as the CDN 134. It is understood that, in some instances, broadcast and/or multicast datagrams can be routed to more than one UE 112 attached to the same eNB 106. Alternatively or in addition, broadcast and/or multicast datagrams can be routed to more than one UE 112 attached to different eNBs 106.

Without limitation, reference to various interfaces, such as S1, S5, S11, M1, and M3 refer to EPS interfaces. In some instances, such interface designations are combined with a suffix, e.g., a "U" or a "C" to signify whether the interface relates to a "User plane" or a "Control plane." In addition, the core network 104 can include various signaling bearer paths/interfaces, e.g., control plane paths/interfaces. The bearer paths and signaling bearer paths are only illustrated as examples and it should be noted that additional bearer paths and signaling bearer paths may exist that are not illustrated.

Figure 2:
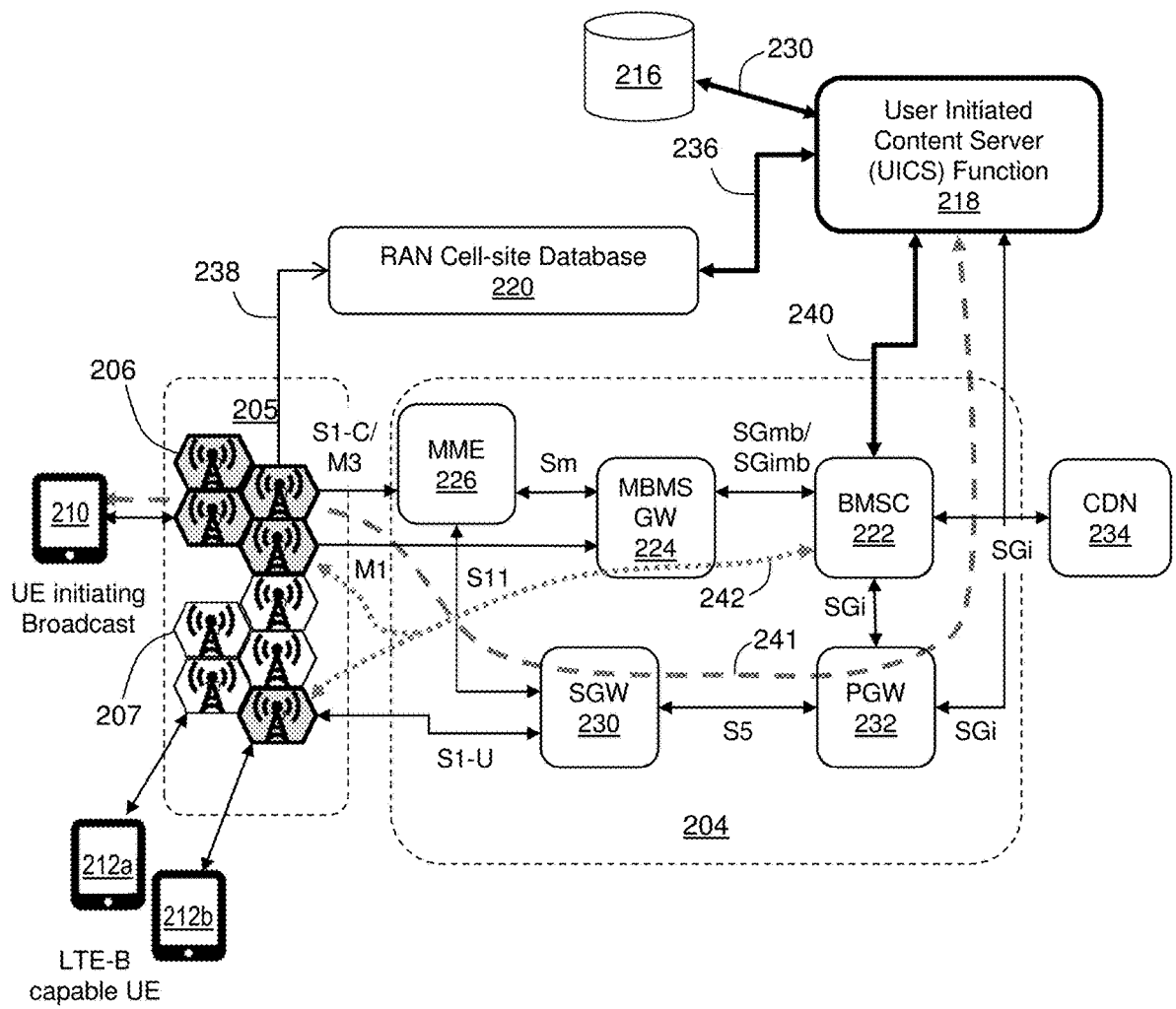
FIG. 2 depicts another illustrative embodiment of a user-initiated broadcast system.

FIG. 2 depicts another illustrative embodiment of a user-initiated broadcast system 200. The system includes an evolved packet core (EPC) 204 and an eUTRAN 205. The EPC 204 includes an MME 226, an SGW 230 and a PGW 232. The EPC also includes an MBMS-GW 224 and a BMSC 222 that provide evolved MBMS (eMBMS) services to mobile UEs 210, 212a, 212b, by way of eNBs 206, 207 of the eUTRAN 205.

The system 200 also includes a user-initiated content server function 218, a RAN cell-site database 220 and a data store 216. The RAN cell-site database 220 includes identities and related coverage areas for the eNBs 206, 207 of the eUTRAN 205. The user-initiated content server function 218 is communicatively coupled to the RAN cell-site database 220, the data store 216, the PGW 232 and the BMSC 222.

In operation, the user-initiated content server function 218 detects a request to distribute media content originating at a source mobile UE 210 to multiple UEs 212a. The user-initiated content server function 218 determines a geographical region to receive the broadcast/unicast and/or a group of eNBs 206 to provide the broadcast/unicast services. For applications in which a geographical region is identified, the user-initiated content server function 218 queries the RAN cell-site database 220 to identify a group of eNBs 206 that provide wireless services within the geographical region.

A source mobile UE 210 associated with the request establishes a unicast service, by which media content is transferred by uplink data packets to the user-initiated content server function 218. In some embodiments, at least a portion of the media content is stored or otherwise buffered in the data store 216. The unicast service is managed through the MME 226, the SGW 230 and the PGW 323 of the EPC 204. The user-initiated content server function 218 facilitates an eMBMS service of the EPC 204 and the eUTRAN 205 to deliver the uplinked media content obtained by the unicast, to one or more wireless UEs 212a in the geographic region. The user-initiated content server function 218 provides the uplinked media content to the BMSC 222 that distributes the media content to identified eNBS 206 by way of the MBMS-GW 226.

In the illustrative example, the eUTRAN 205 includes a number of eNBs 206, 207. A first group of the eNBs 206 includes those eNBs identified by way of the RAN cell-cite database 220 to provide wireless coverage in the geographical region. A second group of eNBs 207 includes any other eNBs of the eUTRAN 205 not identified to provide wireless coverage. Downlink data packets including the uplinked media content are distributed to the first group of eNBs 206, and broadcast in association with an established eMBMS bearer service. A first group of mobile UEs 212a within a coverage region of the first group of eNBs 206 can receive the downlink data packets by way of the eMBMS service. A second group of mobile UEs 212b that are not within the coverage region of the first group of eNBs 206 or are otherwise attached to the second group of UEs 207, do not receive or otherwise access the downlink data packets providing the media content.

In some embodiments, distribution of content from the mobile UE 210 begins with a unicast feed, e.g., a media content feed, from the mobile UE 110 to a network destination. For example, the CDN 234 receives and temporarily stores or buffers the media content received from the source UE 210 by way of a unicast uplink from the UE 210 to the CDN 234. The media content can be distributed to one or more other mobile UEs 212a by way of a broadcast and/or multicast from the CDN 234 to the UEs 212a.

It is understood that in at least some embodiments, the user-initiated content server function 218 and/or the CDN 234 can forward media content originating at the UE 210 to one or more other UE 212a, 212b by way of individual unicast feeds to each of the other UE 212a, 212b. In this configuration, the CDN 234 has to manage simultaneous unicast connections to each of the mobile UEs 212. Such unicast service can be used for UEs 212 that may not be capable of receiving eMBMS service, for eNBs 206 that are not capable of providing eMBMS bearer service and/or for any other reason, including without limitation, network conditions, subscription features, authorizations, and the like.

It is understood that in at least some embodiments, the user-initiated content server function 218 and/or the CDN 234 can forward media content originating at the UE 210 to one or more other UE 212a, 212b by way of individual unicast feeds to each of the other UE 212a, 212b. In this configuration, the CDN 134 has to manage simultaneous unicast connections to each of the mobile UEs 112. Such unicast service can be used for UEs 212 that may not be capable of receiving eMBMS service, for eNBs 206 that are not capable of providing eMBMS bearer service and/or for any other reason, including without limitation, network conditions, subscription features, authorizations, and the like.

The techniques disclosed herein support a distribution or sharing of user-generated and localized real-time content via high-speed mobile network assisted delivery in targeted geo-mapped areas using selective broadcast transmission modes. Head-end content systems and/or application server functions can be configured to take dynamic feeds from mobile user equipment, e.g., in real-time, and conduct appropriate analytics to translate such feed as an incremental revenue generating premium content on demand.

Applications include emergency (police, fire, ambulance)/public safety (border control, suspect identification etc.) and other (news sharing) scenarios. The aggregation offered is well suited for applications in which interested viewers and/or subscribers are aggregated in a particular geographic region.

In some embodiments, a mobile application running on the source mobile UE 212 selects a target broadcast serving area and informs the user-initiated content server function 218 of one or both of the request initiate a broadcast and the target broadcast serving area. The media content can include real-time content streamed live (uplink) from the source mobile UE 210. For example, the media content can include live content from one or more sensors/detectors of the mobile UE 210, such as a camera, and/or a microphone. It is understood that data from other sensors can be provided as well, including without limitation, acceleration, temperature, humidity, biometric data, e.g., blood pressure, body temperature, blood sugar level, heart rate, pulse, electrical activity, and the like. In some embodiments, the content is obtained from a secondary device communicatively coupled to the source mobile UE 210, such as one or more of any of the foregoing examples.

Although reference is made to real-time content, it is understood that the real-time content can include, without limitation, content stored and/or otherwise pre-processed that is accessible by the source mobile UE 210. Examples include pre-recorded content, such as images, video, audio. In some embodiments, pre-recorded content can be integrated with real-time content, as in a news report that includes live commentary together with pre-recorded, edited segments. Such flexibility would allow a user, such as a reporter, to record content during an investigative stage, optionally edited the content, and broadcast the investigative results along with live commentary.

The user-initiated content server function 218 can check source mobile UE 210 and/or user privileges to enable LTE-Broadcast in the selected target broadcast serving area. A user and/or the UE 210 may have privileges and/or restrictions to enable LTE-Broadcast to certain geographical regions. It is envisioned that not all users/UE will have the privilege to enable LTE-Broadcast.

The user-initiated content server function 218 can check if target cell-sites are LTE-Broadcast capable and licensed accordingly for service delivery. Also, the target broadcast serving area may not be contiguous. The target area can include, without limitation, overlapping or areas, including areas including and/or adjacent to the source mobile UE 210. It is understood that a privileged device/user can enable LTE-Broadcast to a remote location. For example, a privileged user in Alaska can initiate the LTE-Broadcast content in Seattle, Wash.

In at least some embodiments, users can subscribe to receive and tune to LTE-Broadcast content automatically or when they are in certain geographical regions. Subscribers in a target broadcast serving area can be notified of any incoming and/or ongoing LTE-broadcast streams. In some embodiments, the mobile UE 212a are provided with an option to selectively and/or automatically play the LTE-Broadcast content. It is also understood that any content initiated from the source mobile UE 210 can also be viewed as unicast over LTE or Wi-Fi or any other wireline or wireless technology that can access the user-initiated content server function 218.

Figure 3:
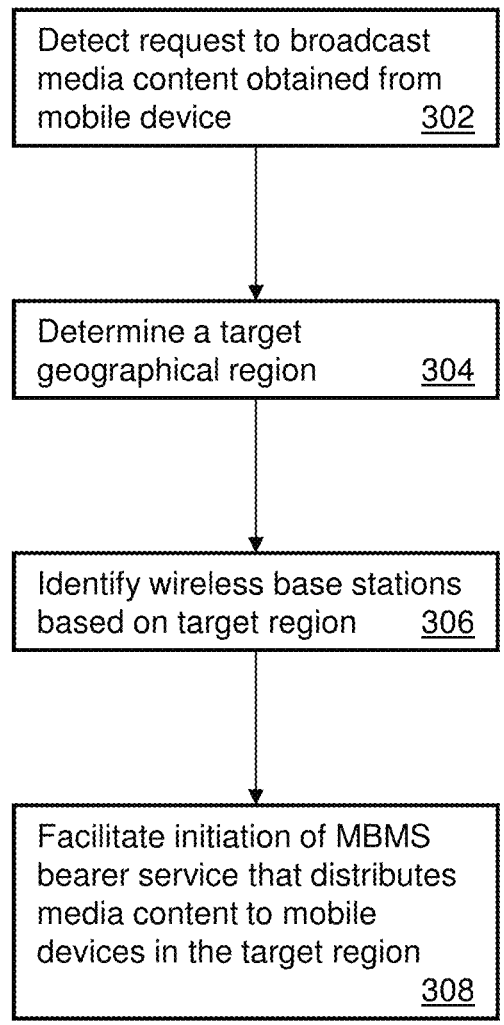
FIG. 3 depicts an illustrative embodiment of a process used in portions of the system described in FIGS. 1 and 2.

FIG. 3 depicts an illustrative embodiment of a process 300 used by the systems 100, 200 of FIGS. 1 and 2. The process includes detecting a request to broadcast media content obtained from a mobile device at 302. The request can include a message received from the mobile device 210 and/or another entity, such as the user-initiated content server 218, or some other application server, such as a group communication services application server.

The request can indicate that media content is available for distribution to a group of mobile devices. The media content, which originates from the mobile device 210, can include a media stream originating at the mobile device 210. In some embodiments, the request precedes availability of the media content, e.g., as in an announcement that media content will follow. Alternatively or in addition, the request may coincide with availability of the media content. For example, the request relates to a concurrent media stream.

It is understood that in at least some embodiments, at least a portion of the media stream can be buffered. Buffering can occur in one or more locations, such as on the originating mobile device 210, at the user initiated content server 218, at a storage location 216 in communication with the user initiated content server 218 and/or at another network accessible buffer location, such as a buffer device of the content data network 234. The buffer depth can be selected according to one or more of a broadcast request processing time, a message transfer time, e.g., through the mobility network 204, a QoS, network conditions, time of day, day of week, base transfer station conditions, a network location, a network configuration, a geographic location, and the like. A chosen buffer depth can provide a corresponding delay that is sufficient to allow for a broadcast of the media content to occur without interruption, outage and/or processing delay.

In some embodiment, the request message also includes a geographic region. The geographic region, e.g., can be used by a user initiated content server 218 to provide media content to a group of mobile devices in an orderly manner. Alternatively or in addition, another entity, such as a network operator, can specify the geographical region. In at least some applications, a broadcast geographical region can also be pre-configured, e.g., by the UICS 218. For example the UICS can associate, a specific mobile device with a particular region, e.g., Redmond, Wash. (a suburb of Seattle). Pre-configuration of the broadcast region can be based on a device indicator, such as an International Mobile Subscriber Identity (IMSI). The device, by the association, would then have the ability to broadcast in Redmond, without having to select a geo-region. One or more of the source mobile device 210, e.g., a broadcast application resident on the mobile device 210, the user initiated content server 218 and the network operator can identify one or more of a first geographic region that receives an MBMS broadcast mode distribution of the media content, a second geographic region that receives an MBMS multicast mode distribution of the media content, and a third geographic region that receives a unicast mode distribution of the media content.

It is envisioned that an original request, e.g., obtained from the source mobile device 210 can be altered or otherwise modified by another entity, such as the user initiated content server 218 and/or the network operator. Such alternations can be based on one or more of user authorizations, a number and/or type of recipient mobile devices within the geographical region, a state of the mobility network, e.g., a QoS, congestion, error rates, signal to noise ratios, a priority associated with the request, and so on. For example, an original request may include a geographical region, e.g., the Tri-State area surrounding New York City (NYC). Based on any of the aforementioned alternations, the request may be divided into different sub-regions, such as the different states, different boroughs of the City, and so forth. If authorization is for New York only, then the requested Tri-State region would be modified to New York only, such that the broadcast would be provided to the authorized New York portion of the Tri-State area, and not to unauthorized New Jersey (NJ) or Connecticut (CT) regions.

In at least some embodiments, a request can include one or more broadcast features. By way of non-limiting example, broadcast features can include one or more of a target device format, e.g., small-screen versus high-definition, a quality and/or resolution, mono audio, stereo, and so on. It is envisioned that a request identifying a particular feature, such as image and/or sound quality, can be modified based on one or more of authorization, network conditions, network charges, and the like. It is understood that a request that identified one or more features for a specified broadcast region can be modified differently in each of a number of sub-regions. For example, if the mobility network is suffering congestion in the NYC area, but not in NJ or CT, then a request for a relatively high quality broadcast media in the Tri-State area can be tailored to deliver high quality to the NJ and CT, but to deliver a lesser quality to the NYC area based on the congestion.

In at least some embodiments, network conditions can be monitored and updated, such that a feature of a broadcast can be adjusted during a broadcast. Consider in the example above that network congestion in the NYC area subsides during the broadcast. One or more of the mobility network 204 and the user initiated content server 218 can request and/or adjust the MBMS bearer service to the NYC area to a higher quality according to the original request. Likewise, an increase in congestion in another area, such as NJ, during the broadcast can result in a reduction in quality.

A geographical area or region is determined at 304. In some embodiments, the target geographical region can be determined directly from the request, e.g., northern NJ. The geographical area can be defined according to a defined region on a map, such as national, state, county and/or municipal boundaries. In some embodiments, the geographical area can be defined according to an arbitrary region on a map, such as a circle, polygon, any enclosed shape, a boundary alone or in combination with one or more of a national, state, county, or municipal boundary.

In some embodiments, the area can be predetermined, e.g., defined in association with a subscribed service, a user profile, a default value, by a mobile application of the source mobile device 210, and the like. In some embodiments, multiple geographical areas are identified, e.g., predetermined. One or more of the multiple geographical areas can be selected in association with a particular broadcast. Selection of a particular one of multiple geographical areas can be based on one or more of a location of the source mobile device 210, a subject matter of the media content, a priority associated with one or more of the request or a subscriber service, an authorization, e.g., an identity of a user of the source mobile device 210, and so on.

Wireless base stations 206 are identified at 306 based on a target geographical region that receives the media content. Once the target geographical region has been identified, it can be used in combination with cellular coverage maps to identify one or more base stations 206 that provide coverage to the target geographical region. In some embodiments, the base stations 206 provide full coverage spanning the entire target geographical region. Alternative, the base stations 206 may provide a partial coverage, as coverage may not be available in certain portions of the geographical region. Nevertheless, a suitable number of base stations 206 are identified based on the target geographical region. In at least some embodiments, base stations 207 of the mobility network that do not provide wireless services in the target region can be ignored.

Initiation of an MBMS bearer service in the target region is facilitated at 308 by way of the identified wireless base stations 206. For example, an MBMS bearer service is established at each of the identified wireless base stations 206.

In some embodiments, the request for media content distribution prompts a request for a selection between a broadcast mode, a multicast mode and/or a unicast mode for distributing the media content in the target area. For example, a selection can be based on set of attributes. In some instances, a mobile operator decides which service based on one or more of the identified base station(s), the identity of the target class/group, the target region, and so forth. Network analytics can be applied in a determination, e.g., based on a number of wireless devices per base station and/or sector coverage area, the type and/or quantity of data to be transferred, a priority, network charges, subscriptions, and the like.

An estimate of a number of wireless devices can be based on one or more of device/product registration data, historical communication records, population, number of households, income and/or other demographics, or any other means of estimating. For example, historical records can be created and/or updated by devices periodically connected to network to complete status reporting and/or schedule/on-demand data transfers based on combination of triggers received from device/network and application service providers. It is also envisioned that learning can be applied based on a network analytics function that includes cell site data, targeted coverage area, device type, priority access, etc.

Beneficially, there is no need for the recipient wireless communication devices to provide location information to the system. They just have to be in a geographical area and in a sector served by a base station of the mobility network during an occasion of the MBMS/eMBMS message.

In some embodiments, the wireless communication devices can be configured to always listen to a network broadcast channel in idle and connected modes. To this end, a device that happens to be in a connected mode will still receive the MBMS/eMBMS service message.

Figure 4:
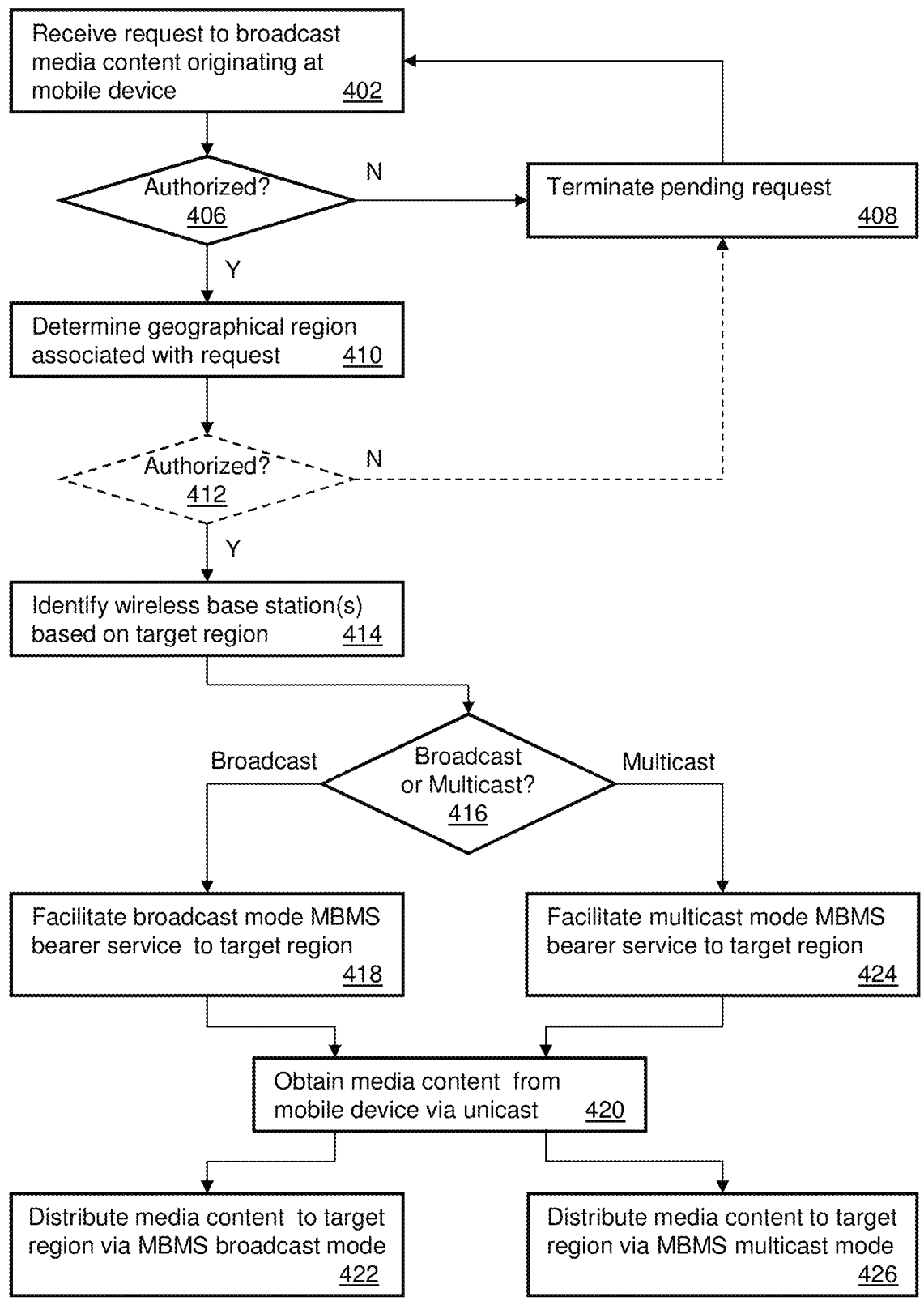
FIG. 4 depicts an illustrative embodiment of another process used in portions of the system described in FIGS. 1 and 2.

FIG. 4 depicts an illustrative embodiment of another process used by the systems 100, 200 of FIGS. 1 and 2. A request to initiate a group communication service that distributes media originating at one mobile device to any number of other wireless devices, is received at 402. As disclosed herein the request can be received from one of the originating mobile device, the user initiated content server 118, and/or some other data transfer entity, such as a group communication service application server.

A determination is made at 406 as to whether the request is authorized. The request can remain pending during authorization process. To the extent that the pending request is not authorized, it is terminated at 408. To the extent that the pending request is authorized, a geographical region associated with request is determined at 410. The region can be identified by the request itself, by the originating mobile device, by the mobility network, by a third party service provider, or by any other suitable means of identifying a region that relates to the request.

A determination is made at 412 as to whether the pending request is authorized for the associated geographical region. To the extent that the pending request is not authorized, it is terminated at 408. To the extent that the pending request is authorized, one or more wireless base station(s) 206 are identified at 414. Identification of the base stations 206 is based on the target region or area as disclosed herein. The identified base stations provide coverage within the target region. In some embodiments, the base stations provide coverage to the entire region, whereas in others such coverage is not possible. In the latter situation, the base stations are identified to provide the best coverage possible. It is understood that the geographical region can include one contiguous region or multiple regions that may be adjoining or neither adjoining nor continuous.

In some embodiments a subsequent determination is made at 416 as to whether the MBMS bearer service will be accomplished by a broadcast mode or a multicast mode. It is understood that the MBMS broadcast/multicast determination can be determined globally for all identified base stations, or individually for each of the identified base station or sub-groups of base stations.

To the extent that broadcast mode is selected, an MBMS bearer service for the broadcast mode is facilitated at 418. Media content from the originating mobile device is obtained at 420 and the media content is distributed by way of the MBMS broadcast mode at 422.

To the extent that multicast mode is selected, an MBMS bearer service for the multicast mode is facilitated at 424. Media content from the originating mobile device is obtained at 420 and the media content is distributed by way of the MBMS multicast mode at 426. In either instance, the media content can be obtained from the mobile device, e.g., by way of a unicast bearer service providing uplink data packets. In some embodiments, the media content is obtained from the mobile device by another network accessible device, such as a group communication service application server, an application server, e.g., of a content data network, and the like. The other network accessible device can serve as a distribution and/or buffer point from which the MBMS bearer service obtains the media content.

In some embodiments, a unicast mode can be selected as an alternative or in combination with one or more of the broadcast and multicast modes. To the extent that a unicast mode is selected, one or more unicast paging messages are generated, identifying members of the target group. A unicast service is initiated and the paging message is distributed by way of the unicast service. To the extent that additional data is associated with the paging message, a unicast transfer of the pending data is initiated. It is understood that the same unicast service or different unicast services can be used for each of the paging message and the subsequent data transfer.

While for purposes of simplicity of explanation, the respective processes are shown and described as a series of blocks in FIGS. 3 and 4, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

The techniques disclosed herein offer advantages when compared to over-the-top social media/reporting services such as iReport/CNN, Facebook, Twitter etc. For example, the mobile user-initiated broadcast service offers an additional Revenue stream to network and/or third-party service providers. The user-initiated broadcast service allows users, including news reporters, law enforcement agencies, weather agencies, public service agencies, and the like, to instantly broadcast live content to mobile users in preferred geographical region. The particular regions can be determined, e.g., by a region associated with a news item, e.g., a city, and/or neighborhoods, communities subject to an emergency, such as an Amber Alert, a weather event, and the like.

It is generally understood that any investment cost to offer user-initiated broadcast service would be marginal, as the solution re-uses a majority of existing infrastructures by introducing few enablers, such as the user initiated content server function 118, 218. Device/OS manufacturers would benefit by integrating user initiated instant LTE broadcast function, and operational costs can be reduced through an optimized and alternative content delivery mechanism.

It is believed that user-initiated broadcast services would enhance user-experience. Placing the power to reach the masses from one's mobile device can enable an individual to stir and fuel mass and localized movements. Of course, it is appreciated that regulation mechanisms can be implemented, e.g., by network operators. Regulation mechanisms can include authorizations, priorities, applications, network states, and the like. Beneficially, user-initiated LTE-Broadcast capable users can participate in the localized event as it happens rather than viewing and posting comments later.

In some embodiments, mobile users can subscribe to receive and tune to LTE-Broadcast content automatically or selectively. For example, mobile users can subscriber to receive a broadcast when their mobile devices are in a particular geographical region. It is envisioned in any of the illustrative examples provided herein that quality need not be compromised as the content is delivered via broadcast and not as unicast to each subscribers. Namely, network bandwidth and/or RF frequency savings of broadcast/multicast can allow a network service provider to allocate more resources to the broadcast/multicast streams.

Figure 5:
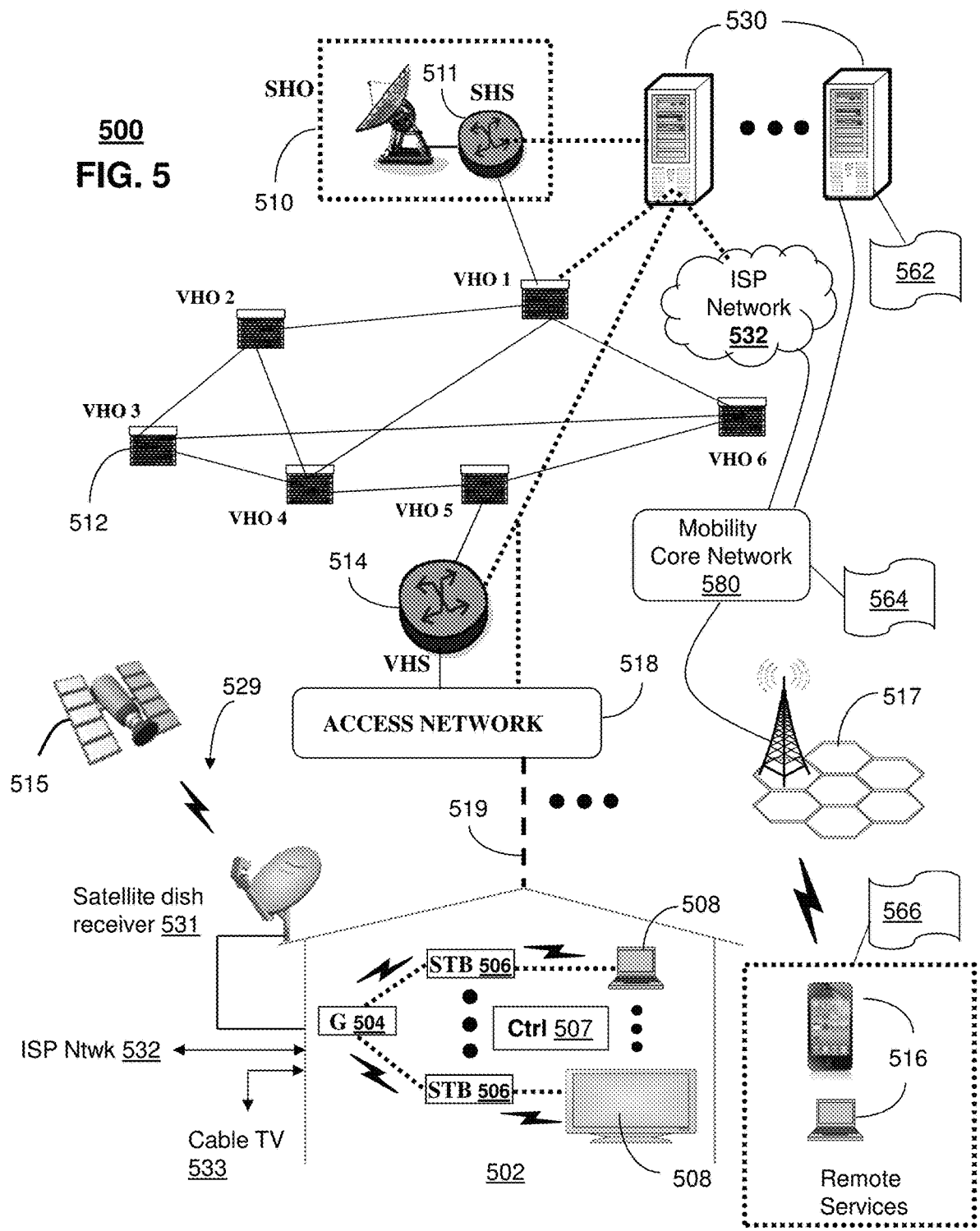
FIG. 5 depict illustrative embodiments of communication systems that provide ingestion and dissemination of user-initiated broadcasts.

FIG. 5 depicts an illustrative embodiment of a first communication system 500 for delivering media content. The communication system 500 can represent an Internet Protocol Television (IPTV) media system. Communication system 500 can be overlaid or operably coupled with the user-initiated broadcast system 100, 200 of FIGS. 1 and/or 2, as another representative embodiment of communication system 500. For instance, one or more devices illustrated in the communication system 500 of FIG. 5 can receive a request to initiate a wireless media broadcast of media content provided by a first mobile device to mobile devices in a geographical area by way of a wireless mobility network. Alternatively or in addition, one or more of the devices can detect a geographical area associated with any request and identify a group of wireless access terminals that provide wireless services within the geographical area. One or more of the devices can facilitate establishment of an MBMS bearer service, content management, access restrictions, and the like.

The IPTV media system can include a super head-end office (SHO) 510 with at least one super head-end office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 518 to commercial and/or residential buildings 502 housing a gateway 504 (such as a residential or commercial gateway). The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, power line or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services. System 500 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508 or wireless communication devices 516.

Communication system 500 can also provide for all or a portion of the computing devices 530 to function as a user-initiated content server 530. The user-initiated content server 530 can use computing and communication technology to perform function 562, which can include among other things, the user-initiated broadcast/multicast techniques described by the process 300 of FIG. 3 and/or the process 400 of FIG. 4. For instance, the function 562 of the user-initiated content server 530 can be similar to the functions described for the user-initiated content server 118 of FIG. 1 in accordance with process 300 and/or process 400. One or more nodes of a mobility core network 580 and wireless communication devices 516 can be provisioned with software functions 564 and 566, respectively, to utilize the services of the user-initiated content server 530. For instance, the function 564 of the mobility core network 506 can be similar to the functions 142 described for the user-initiated content server 118, the MME 126, and/or the eNB 106 of FIG. 1 in accordance with the process 300 of FIG. 3 and/or the process 400 of FIG. 4. Likewise, the function 566 of wireless communication devices 516 can be similar to the functions 144 described for the communication devices 110 of FIG. 1 in accordance with the process 300 of FIG. 4 and/or the process 400 of FIG. 4.

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 6:
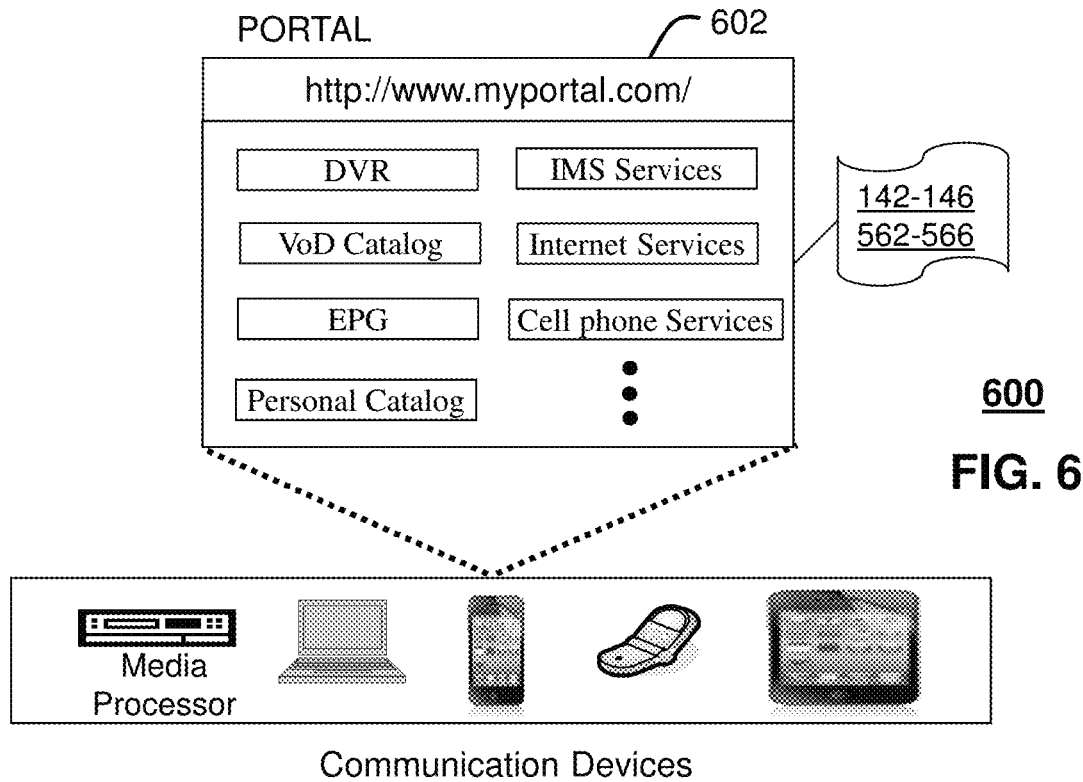
FIG. 6 depicts an illustrative embodiment of a web portal for interacting with the communication systems of FIGS. 1-2, and 5.

FIG. 6 depicts an illustrative embodiment of a web portal 602 of a communication system 600. Communication system 600 can be overlaid or operably coupled with mobile user-initiated broadcast systems 100, 200 of FIGS. 1 and/or 2, and/or communication system 500 as another representative embodiment of the mobile user-initiated broadcast systems 100, 200 of FIGS. 1 and/or 2, and/or communication system 500. The web portal 602 can be used for managing services of mobile user-initiated broadcast systems 100, 200 of FIGS. 1 and/or 2 and communication system 500. A web page of the web portal 602 can be accessed by a Uniform Resource Locator (URL) with an Internet browser using an Internet-capable communication device such as those described in FIGS. 1 and/or 2, and FIG. 5. The web portal 602 can be configured, for example, to access a media processor 506 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 506. The web portal 602 can also be used for provisioning IMS services described earlier, provisioning Internet services, provisioning cellular phone services, and so on.

The web portal 602 can further be utilized to manage and provision software applications 142-146, 562-566 to adapt these applications as may be desired by subscribers and/or service providers of the mobile user-initiated broadcast systems 100, 200 of FIGS. 1 and/or 2, and the communication system 500. For instance, users of the services provided by server mobile user-initiated broadcast server 118, 228 or server 530 can log into their on-line accounts and provision the servers 118 or server 530 to create or otherwise modify user profiles, provide contact information to server to enable it to communication with devices described in FIGS. 1-2 and 5, verify identity or authorization, associate user equipment, determine geographical regions, identify content, content and/or distribution feature, such as quality, bandwidth, and so on. Service providers can log onto an administrator account to provision, monitor and/or maintain the mobile user-initiated broadcast systems 100, 200 of FIGS. 1 and/or 2 or server 530.

Figure 7:
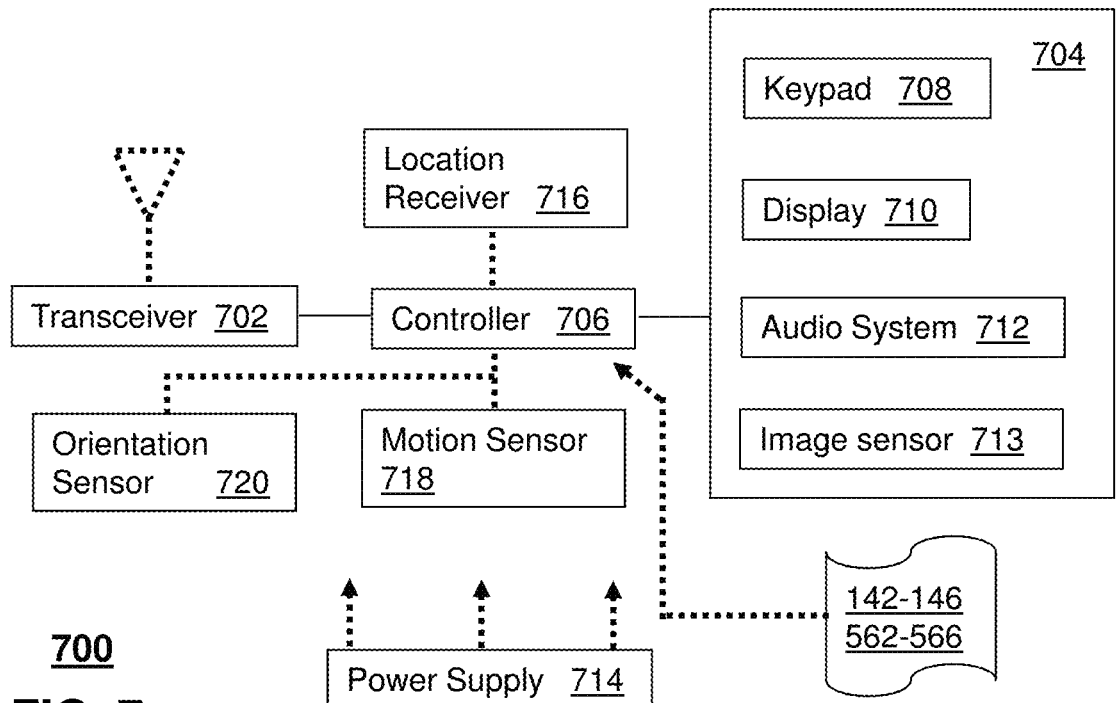
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1 and/or 2, and FIG. 5 and can be configured to perform portions of the process 300 of FIG. 3 and/or the process 400 of FIG. 4.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of one or more of the devices of the user-initiated broadcast systems 100, 200 of FIGS. 1 and/or 2, the media processor 506, the media devices 508, or the portable communication devices 516 of FIG. 5. It will be appreciated that the communication device 700 can also represent other devices that can operate in the user-initiated broadcast systems 100, 200 of FIGS. 1 and/or 2, and/or the communication systems 500 of FIG. 5 such as a gaming console and a media player. In addition, the controller 706 can be adapted in various embodiments to perform the functions 142-146 and 562-566.

Upon reviewing the aforementioned embodiments, it would be evident to an artisan with ordinary skill in the art that said embodiments can be modified, reduced, or enhanced without departing from the scope of the claims described below. For example, in some embodiments, a coordinator can request and/or manage real-time media content from multiple mobile sources 110. For example, multiple users can pre-register or otherwise associate or affiliate with a coordinator. The coordinator can request media content contributions from one or more of the multiple users or subscribers. Alternatively or in addition, the coordinator can receive requests to broadcast live content from the multiple mobile sources 110.

By way of example, multiple users may be attending an event, such as a sporting event, a public rally, and the like. Each user offers a unique vantage point and/or selection of subject matter from the event. The coordinator can receive media content from all of the multiple users by independent unicast uplink services. The coordinator can select one or more of the media content streams from the independent unicast streams, and provide the selected media content to a group of mobile devices by way of a multicast and/or broadcast bearer service. Individual contributors can be swapped in and out sequentially and/or displayed simultaneously, e.g., in a picture-in-picture, or segmented display, e.g., split-screen configuration. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
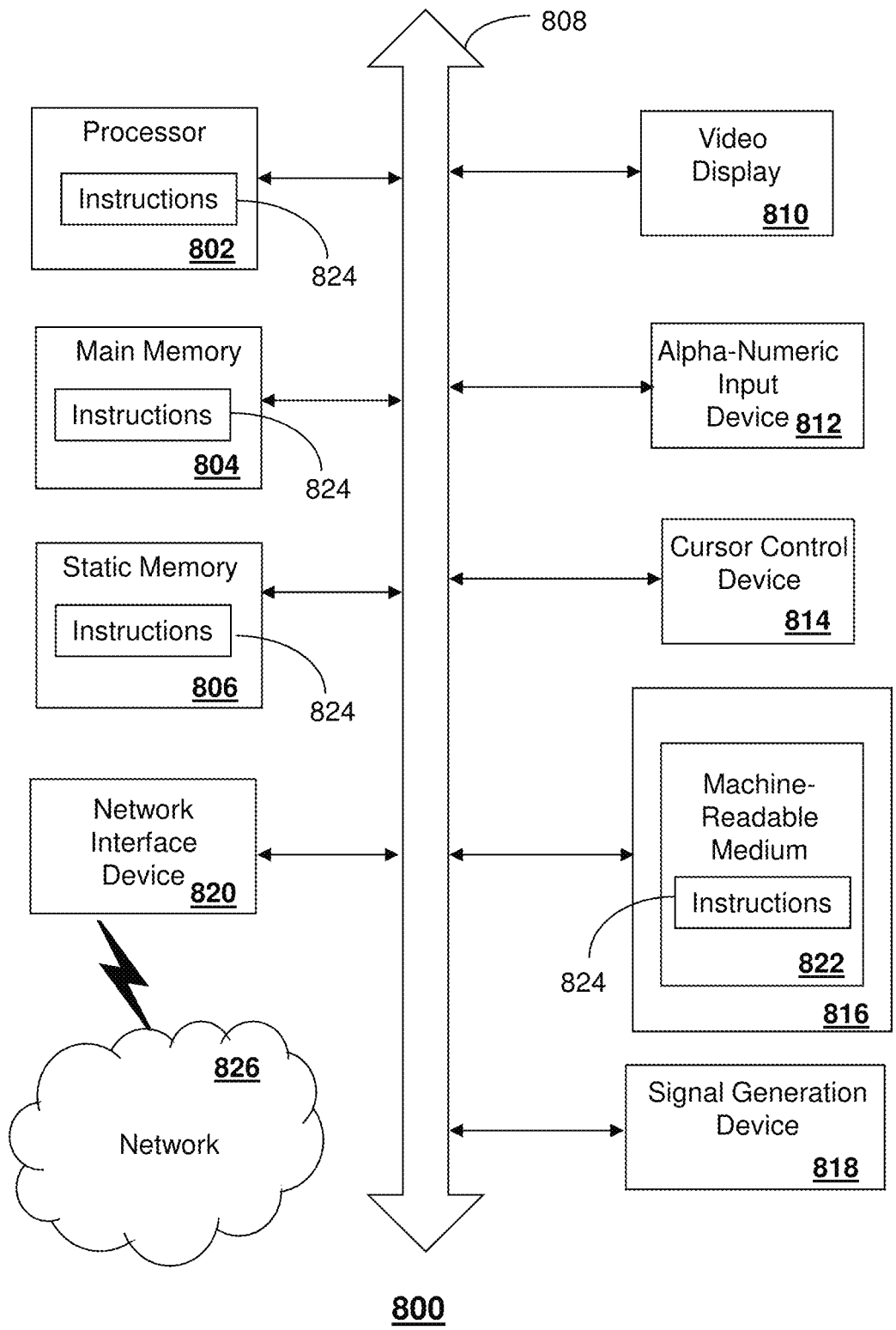
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the user-initiated content server function 118, 218, as the RAN cell-site database 120, 220, as the CDN 134, 234, as the eNBs 106, 206, as elements of the core network, 104, 204, as the server 530, the media processor 506 and other devices of FIGS. 1-2 and 5-7. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
a processing system including a processor; and
a memory that stores executable instructions that, when executed by the processing system, facilitates performance of operations, the operations comprising:
receiving media content from a first mobile device by way of a wireless mobility network;
detecting a request initiated by the first mobile device to broadcast the media content within a user-defined target serving area by way of the wireless mobility network, wherein the request identifies the user-defined target serving area, wherein a plurality of mobile devices within the user-defined target serving area are provided a notification of an availability of the media content, and wherein the notification includes a prompt to accept or reject the media content;
detecting an identity associated with the request initiated by the first mobile device;
determining, according to the identity, an authorization for the first mobile device to access a Multimedia Broadcast/Multicast Service (MBMS) bearer service;
identifying a base station of the wireless mobility network based on the user-defined target serving area, wherein the base station provides wireless services to a serving area within the user-defined target serving area; and
directing the base station to facilitate initiation of the MBMS bearer service for use by the first mobile device to broadcast the media content within the serving area, wherein the media content is distributed to one or more mobile devices of the plurality of mobile devices located in the serving area or entering the serving area responsive to the one or more mobile devices providing an acceptance of the media content, wherein broadcasting the media content within the user-defined target serving area facilitates, for the one or more mobile devices of the plurality of mobile devices, receiving the media content without requiring membership on the part of that mobile device in any multicast group.

2. The system of claim 1, wherein the request to broadcast the media content is initiated by the first mobile device.

3. The system of claim 1, wherein the MBMS bearer service comprises a multicast mode, a broadcast mode, or both.

4. The system of claim 1, wherein the identifying of the base station comprises identifying a plurality of base stations that provide wireless services within the user-defined target serving area.

5. The system of claim 4, wherein the request to broadcast the media content comprises a message that includes an indication of a municipality, wherein the user-defined target serving area is based on the municipality.

6. The system of claim 5, wherein the detecting of the request to broadcast the media content comprises determining the identity of the first mobile device, and wherein the operations further comprise determining the user-defined target serving area based on a predetermined association between the user-defined target serving area and the first mobile device.

7. The system of claim 6, wherein the initiation of the MBMS bearer service is responsive to the detecting of the request, and wherein MBMS bearer service broadcasts the media content in real-time, coincident with the receiving of the media content from the first mobile device.

8. The system of claim 1, wherein the plurality of mobile devices include all mobile devices of the wireless mobility network within the user-defined target serving area.

9. A method, comprising:
receiving, by a processing system comprising a processor, a first request from a first mobile device to broadcast media content within a user-defined target serving area by way of a wireless mobility network wherein the media content is obtained by the first mobile device;
detecting, by the processing system, an identity associated with the first request initiated by the first mobile device;
determining, by the processing system, an authorization of the first mobile device to access a Multimedia Broadcast/Multicast Service (MBMS) bearer service;
identifying, by the processing system, a base station of the wireless mobility network based on the user-defined target serving area, wherein the base station provides wireless services to a serving area within the user-defined target serving area; and
submitting, by the processing system, a second request to the base station to facilitate initiation of the MBMS bearer service for use by the first mobile device to broadcast the media content within the serving area, wherein the media content is distributed to one or more mobile devices of a plurality of mobile devices located in the serving area or entering the serving area responsive to the one or more mobile devices providing an acceptance of the media content, wherein broadcasting the media content within the serving area facilitates, for the one or more mobile devices of the plurality of mobile devices, receiving the media content without requiring membership on the part of that mobile device in any multicast group.

10. The method of claim 9, wherein the identifying of the base station comprises identifying a plurality of base stations that provides the wireless services within the user-defined target serving area.

11. The method of claim 9, wherein the submitting of the second request to the base station to facilitate the initiation of the MBMS bearer service is responsive to the receiving of the first request, and wherein the MBMS bearer service broadcasts the media content in real-time, coincident with an obtaining of the media content from the first mobile device.

12. The method of claim 9, further comprising:
receiving, by the processing system, a unicast from the first mobile device providing the media content; and
buffering, by the processing system, a portion of the media content to obtain a buffered portion,
wherein the MBMS bearer service broadcasts the buffered portion within the serving area.

13. The method of claim 9, wherein the plurality of mobile devices within the user-defined target serving area are provided a notification of an availability of the media content, wherein the notification includes a prompt to accept or reject the media content, and wherein the first request comprises one of a text message, a voice message, an email, a telephone call, or an application message.

14. The method of claim 9, wherein the MBMS bearer service distributes the media content to each mobile device of the wireless mobility network within the serving area.

15. A non-transitory, machine-readable storage medium, comprising executable instructions that, when executed by a processor, facilitate performance of operations, comprising:
receiving, via a first mobile device, a request to initiate a wireless media broadcast of media content by way of a wireless mobility network within a user-defined target serving area, wherein the request identifies the user-defined target serving area, and wherein the media content is provided by the first mobile device;
detecting an identity associated with the request initiated by the first mobile device;
determining an authorization of the first mobile device to access a Multimedia Broadcast/Multicast Service (MBMS) bearer service;
determining a group of wireless access terminals based on the user-defined target serving area, wherein the group of wireless access terminals provides wireless services of the wireless mobility network to a serving area within the user-defined target serving area;
providing a notification of the request to initiate the wireless media broadcast to a plurality of mobile devices within the serving area, wherein the notification includes a prompt to accept or reject the media content; and
directing the group of wireless access terminals to facilitate initiation of the MBMS bearer service for use by the first mobile device to broadcast the media content within the serving area, wherein the media content is distributed to one or more mobile devices of the plurality of mobile devices responsive to the one or more mobile devices providing an acceptance of the media content, wherein broadcasting the media content within the serving area facilitates, for the one or more mobile devices of the plurality of mobile devices, receiving the media content without requiring membership on the part of that mobile device in any multicast group.

16. The non-transitory, machine-readable storage medium of claim 15, wherein the request to initiate the wireless media broadcast is received from the first mobile device.

17. The non-transitory, machine-readable storage medium of claim 15, wherein the determining of the group of wireless access terminals comprises identifying a plurality of wireless access terminals that provide the wireless services within the user-defined target serving area.

18. The non-transitory, machine-readable storage medium of claim 15, wherein the initiation of the MBMS bearer service is responsive to the receiving of the request, and wherein the MBMS bearer service broadcasts the media content in real-time, coincident with a providing of the media content from the first mobile device.

19. The non-transitory, machine-readable storage medium of claim 15, further comprising:
  receiving a unicast from the first mobile device providing the media content; and
  buffering a portion of the media content to obtain a buffered portion, wherein the MBMS bearer service broadcasts the buffered portion within the serving area.

20. The non-transitory, machine-readable storage medium of claim 15, wherein the MBMS bearer service distributes the media content using an MBMS broadcast mode.

* * * * *